United States Patent [19]

Kitayama

[11] Patent Number: 4,865,415

[45] Date of Patent: Sep. 12, 1989

[54] COMPOSITE FIBER-OPTIC OVERHEAD GROUND WIRE

[75] Inventor: Yoshinobu Kitayama, Kanagawa, Japan

[73] Assignee: Sumitomo Electric Industries, Ltd., Osaka, Japan

[21] Appl. No.: 151,993

[22] Filed: Feb. 3, 1988

[30] Foreign Application Priority Data

Feb. 20, 1987 [JP] Japan .................................. 62-23798

[51] Int. Cl.⁴ .............................................. G02B 6/44
[52] U.S. Cl. ................................................... 350/96.23
[58] Field of Search ....................................... 350/96.23

[56] References Cited

U.S. PATENT DOCUMENTS

| | | | |
|---|---|---|---|
| 4,515,435 | 5/1985 | Anderson | 350/96.23 |
| 4,523,804 | 6/1985 | Thompson | 350/96.23 |
| 4,548,664 | 10/1985 | Canivet | 350/96.23 X |
| 4,671,610 | 6/1987 | Kitayama et al. | 350/96.23 |
| 4,723,832 | 2/1988 | Okazato et al. | 350/96.23 |
| 4,725,453 | 2/1988 | Nakasone et al. | 350/96.23 X |

FOREIGN PATENT DOCUMENTS 62-147216 9/1987 Japan .
2144237A 2/1985 United Kingdom ............. 350/96.23

Primary Examiner—Frank Gonzalez
Attorney, Agent, or Firm—Cushman, Darby & Cushman

[57] ABSTRACT

A composite fiber-optic overhead ground wire having an optical unit which includes an optical fiber protecting tube, a spacer having helical grooves formed in its outer periphery, and multiple optical fiber units accommodated in the grooves of the spacer. Each of the optical fiber units includes multiple coated optical fibers formed of an optical glass fiber and a primary coating layer on the outer periphery of the optical glass fiber. The coated optical fibers are stranded around the outer periphery of a tension member. A first heat-resistant thin tape is wound in an overlapping manner around an outer periphery of the stranded coated optical fibers. The first heat-resistant thin tape is surrounded by a layer of interposition material which has a cushioning effect. A second heat-resistant thin tape is wound in an overlapping manner around the outer periphery of the interposition material.

4 Claims, 2 Drawing Sheets

COMPOSITE FIBER-OPTIC OVERHEAD GROUND WIRE

BACKGROUND OF THE INVENTION

The present invention relates to an composite fiber-optic overhead ground wire in which optical fibers are combined with an overhead ground wire, and particularly relates to an improvement in the structure of an optical fiber unit for collectively housing optical fibers.

DESCRIPTION OF THE PRIOR ART

The inventor of this application in Japanese Utility Model Application No. 60-57908/1985, corresponding to Utility Model Unexamined Publication No. 62-147216, has proposed an composite fiber-optic overhead ground wire of the kind as described above. The structure of the proposed composite fiber-optic overhead ground wire includes optical fiber units which are accommodated in grooves of a grooved aluminum spacer. Each of the optical fiber units is arranged so that a plurality of coated optical fibers are stranded around a tension member, and a thin tape is wound around or longitudinally attached to the outer periphery of the stranded coated optical fibers.

FIG. 3 shows a cross section of the structure of a conventional composite fiber-optic overhead ground wire, and FIG. 4 shows the structure of an optical fiber unit included in the composite fiber-optic overhead ground wire of FIG. 3. The optical fiber unit 6 includes a tension member 1, coated optical fibers 4 disposed around the tension member 1, and a heat-resistant thin tape 5 wound around the outer periphery of the coated optical fibers 4. Each of the coated optical fibers 4 contains an optical glass fiber 2 and a primary coating 3 which covers the optical glass fiber 2. The composite fiber-optic overhead ground wire has an optical unit 10 and aluminum-clad steel wires 11 disposed on the outer periphery of the optical unit 10. The optical unit 10 includes an optical fiber protecting tube 9, a grooved spacer 7 having grooves 8, and which is inserted in the optical fiber protecting tube 9, and optical fiber units 6 which are accommodated in the grooves 8.

The structure of the composite fiber-optic overhead ground wire, in which numbers of coated optical fibers 4 can be accommodated, and in which the optical fiber units 6 can be protected by the grooved spacer 7 and the optical fiber protecting tube 9, has superior reliability even under severe conditions.

In the composite fiber-optic overhead ground wire, each optical fiber unit is arranged so that the coated optical fibers, each including an optical glass fiber and a primary coating, are collected around the tension member and the heat-resistant thin tape is wound around the assembled coated optical fibers as a secondary coating and acts as protective layer. As a result of such an arrangement, however, the composite fiber-optic overhead ground wire has a problem in that during the production process, before the optical fiber units have been accommodated within the grooves of the grooved spacer to form the optical unit, each of the optical fiber units is protected by only the heat-resistant thin tape which acts as a protective layer, and therefore each optical unit is vulnerable to side pressure or external pressure which may adversely affect the transmission characteristics of each optical fiber unit.

SUMMARY OF THE INVENTION

In order to solve the problems in the prior art, according to the present invention, the composite fiber-optic overhead ground wire according to the present invention comprises an optical unit composed of an optical fiber protecting tube, a spacer provided with helical grooves formed in an outer periphery of the spacer, and a plurality of optical fiber units. Each of the optical fiber units is formed of an assembly of coated optical fibers and is accommodated in one of the grooves of the spacer. A layer of stranded conductors are provided around an outer periphery of the optical unit. The optical fiber units comprise a tension member, a plurality of coated optical fibers each formed of an optical glass fiber and a primary coating layer provided on an outer periphery of the optical glass fiber, the coated optical fibers being stranded around an outer periphery of the tension member, a first heat-resistant thin tape wound around an outer periphery of the coated optical fibers, a layer of interposition material having a cushioning effect and provided around the first heat-resistant thin tape, and a second heat-resistant thin tape wound around an outer periphery of the layer of interposition material.

Each of the optical fiber units accommodated in the optical unit of the composite fiber-optic overhead ground wire according to the present invention is arranged such that the protecting layer of the optical fibers includes the interposition layer having a cushioning effect provided between the first and second heat-resistant thin tapes. Accordingly, distortion applied to the optical fibers is reduced due to the cushioning effect of the interpositional layer in the case where side pressure is applied to the optical fiber unit during or after manufacturing.

Further, the optical fiber unit according to the present invention has such a structure that the first heat-resistant thin tape is wound around the assembly of the coated optical fibers, the interposition layer having a cushioning effect is provided around the wound heat-resistant thin tape, and the second heat-resisting thin tape is wound on the outer periphery of the interposition layer to thereby form a protection layer for the optical fibers. Accordingly, improper arrangement such as disorder or replacement in arrangement, or the like, of the coated optical fibers during and after manufacturing can be prevented.

In a conventional method of providing a cushioning layer for the optical fiber unit, a heat-resistant tape is directly wounded on the cushioning layer on coated fibers, that is, the first heat-resistant thin tape is omitted. Under the structure, the coated fibers are not fixed firmly and the optical fibers can become disarranged. Accordingly, the present invention as described has a first tape wound on the coated fibers to fix the fiber, the cushioning layer on the first tape and the second tape on the cushioning layer.

The optical fiber unit according to the present invention is structured so that the first heat-resistant thin tape is wound around the coated optical fibers, and maintains the arrangement of the optical fiber unit by pressing the coated optical fibers, the cushioning interposition layer is provided on the outer periphery of the wound first heat-resistant tape and is soft enough that no pressing effect is applied onto the wound first heat-resistant thin tape, and the second heat-resistant thin tape presses the cushioning interposition member while it is wound on the interposition member. Accordingly, the arrangement is effective in reducing the distortion applied to the optical fibers and in preventing the improper arrangement of the coated optical fibers.

BRIEF DESCRIPTION OF THE DRAWINGS

Other features and advantages of the invention will be apparent from the following description taken in connection with the accompanying drawings, wherein.

DETAILED DESCRIPTION OF THE INVENTION

Figure 1:
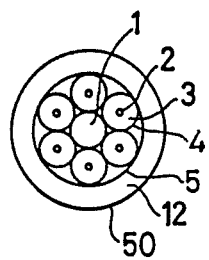
FIG. 1 is a cross section showing the structure of an optical fiber unit to be inserted in the composite fiber-optic overhead ground wire, according to the present invention.

Referring to the drawings, embodiments of the optical fiber unit and the composite fiber-optic overhead ground wire according to the present invention will be described hereunder.

FIG. 1 shows a cross section of the structure of the optical fiber unit according to the present invention. An optical fiber unit 13 is arranged such that coated optical fibers 4, each of which includes an optical glass fiber 2 and a primary coating layer 3 for covering the optical glass fiber 2, are stranded around a central tension member 1. A heat-resistant thin tape 5 is wound around the stranded optical fibers 4, a cushioning interposition material 12 is further provided on the thin heat-resistant tape 5, and then a second heat-resistant thin tape 50 is wound around the interposition material 12.

Figure 3:
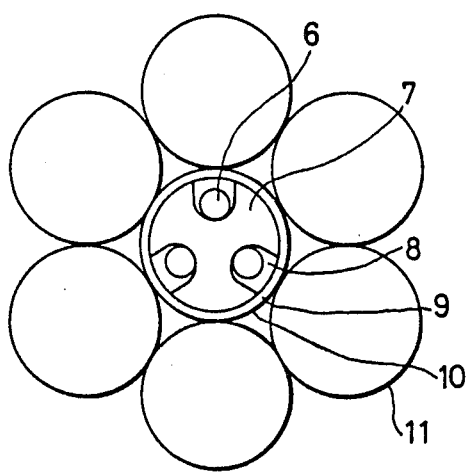
FIG. 3 is a cross section showing the structure of the conventional composite fiber-optic overhead ground wire.
Figure 4:
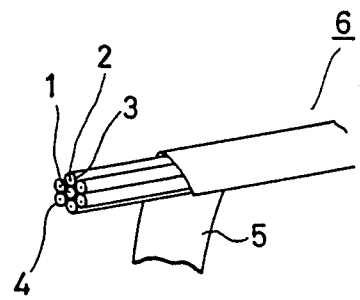
FIG. 4 is a perspective view showing the structure of an optical fiber unit used the conventional composite fiber-optic overhead ground wire.
Figure 5:
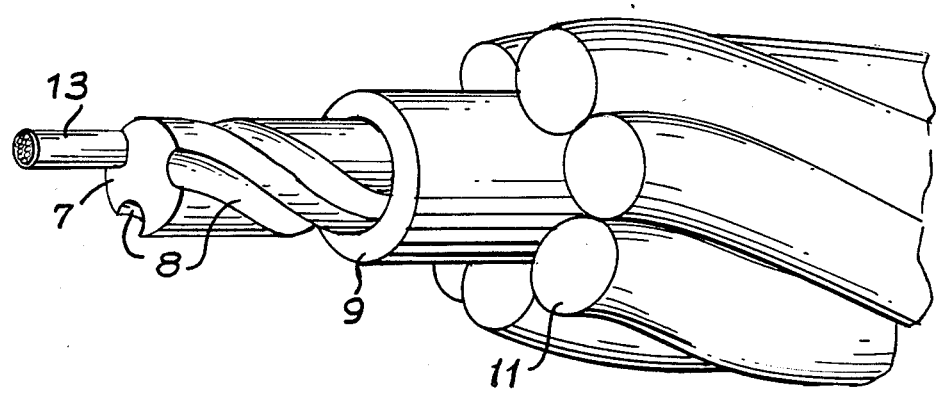
FIG. 5 is a perspective view showing the structure of an embodiment of the composite fiber-optic overhead ground wire according to the present invention.

According to a first embodiment of the present invention the composite fiber-optic overhead ground wire is assembled such that the optical fiber units 13 each having the structure shown in FIG. 1 are accommodated in grooves 8 of a grooved spacer 7 in a structure similar to that shown in FIG. 3. The spacer 7 with the optical fiber units 13 is inserted into an optical fiber protecting tube 9 so as to form an optical unit 10, and aluminum-clad steel wires 11 are twisted around the outer periphery of the optical unit 10.

Description will be made hereunder as to an example of the above-mentioned embodiment. Trial manufacture of composite fiber-optic overhead ground wire having the structure shown in FIG. 3 was made by using the optical fiber units having the structure shown in FIG. 1, according to the present invention.

That is a composite fiber-optic overhead ground wire was produced by using the optical fiber units each of which was formed in a manner so that six silicon-coated optical fibers each having a diameter of 0.4 mm were stranded around an FRP having a diameter of 0.4 mm, a first heat-resistant thin tape was wound in an overlapping manner around the outer periphery of the stranded coated optical fibers, fibers having a cushioning effect were twisted around the outer periphery of the heat-resistant thin tape, and a second heat-resistant tape was wound in an overlapping manner around the outer periphery of the cushioning fibers.

The size and characteristics of the coated optical fibers and the tension member constituting each optical fiber unit are selected on a case by case basis to be suited to the specific cable structure.

Silicon resin was used as the material for the primary coating covering the optical glass fiber in the embodiment, but an optimum resin may be selected in accordance with the characteristics practically required for the specific cable.

Similarly, although nylon fibers, polyester fibers, and aramid fibers or fluorocarbon resin fibers, or the like may be suitably used as the material for the cushioning interposition material, the present invention is not limited to those materials but any material may be used so long as it has a cushioning effect.

Finally, although a teflon tape, a polyimide tape, or the like may be used as the material for the heat-resistant thin tape, the present invention is not limited to those materials specifically.

Figure 2:
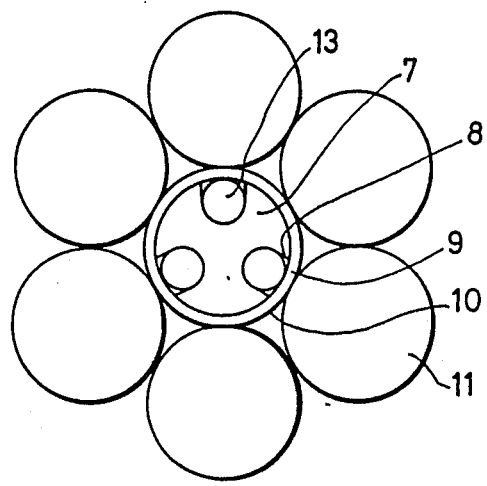
FIG. 2 is a cross section showing the structure of an embodiment of the composite fiber-optic overhead ground wire according to the present invention.

FIG. 2 shows a cross section of the structure of another embodiment of the composite fiber-optic overhead ground wire according to the present invention. In FIG. 2, the same parts as those in FIG. 3 are correspondingly referenced. The embodiment has a structure wherein the optical fiber units 13 having the same structure as those optical fiber units in FIG. 1 are accommodated, in a bound state, in the grooves 8 of the grooved spacer 7. That is, each of the grooves 8 has a groove depth or a groove width selected to be substantially equal to the outer diameter of each optical fiber unit 13 so that the optical fiber unit 13 is tightly accommodated in the groove 8. With the effects of side-pressure decreased by the provision of the interposition material 12 having a cushioning effect, the optical fiber units 13 can be accommodated in an restraint state in the grooves 8 of the grooved spacer 7 as illustrated in FIG. 2.

In the structure of this embodiment, in order to accommodate the optical fiber units 13 in an restraint state in the grooves 8 of the grooved spacer 7, it is sufficient that each of the grooves 8 has a cross section selected so that at least the groove width or the groove depth is set to have a tolerance not larger than ±0.1 mm.

As described above, according to the present invention, the coating layer of the optical fiber unit is arranged such that the first heat-resistant thin tape is wound around the outer periphery of the stranded coated optical fibers in order to press them together, the layer of interposition material having a cushioning effect is provided on the outer periphery of the first heat-resistant thin tape, and the second heat-resistant thin tape is further wound around the outer periphery of the interposition material to press the latter. Accordingly, the following advantages are achieved:

(i) Distortion applied to the coated optical fibers is reduced because the interposition material functions as a shock-absorbing layer against side pressure applied to the optical fiber unit during and after manufacturing.

(ii) Even though the heat-resistant thin tape shrinks while releasing the working distortion when the stranded optical fiber units are exposed to a high temperature, due to the cushioning effect of the interposition material, the shrinkage of the heat-resistant thin tape never causes excessive side pressure to the coated optical fibers.

(iii) Although the temperature at the conductor portion of the cable rises momentarily to about 300° C. during a shorting fault or a lightning strike, the grooved spacer and the coated optical fibers are not in direct contact with each other because the cushioning interposition material is provided therebetween. Thus, the existence of the cushioning layer provides a heat insulating effect.

(iv) The optical fiber units can be accommodated in a restraint state in the grooves of the grooved spacer because the side pressure applied to the optical fibers is reduced by the cushioning layer.

(v) Improper arrangement of the optical fibers can be prevented, since the first tape is wound between the coated fibers and the cushioning layer.

(vi) Even if the interposition material, i.e., the cushioning layer, is deformed, the influence on the optical fibers is kept to a minimum as a result of the layer of heat-resistant thin tape between the cushioning layer and the optical fibers.

(vii) Being provided with the cushioning layer of the interposition material, the optical fiber units can be accommodated in an restraint state in grooves the outer size of which is made substantially equal to the outer diameter of the optical fiber unit, while at the same time preventing side pressure from being applied to the coated optical fibers in the groove. Accordingly, the optical fiber units and the conductor portion of the cable can be integrated, and thus improve the reliability under severe conditions surrounding the composite fiber-optic overhead ground wire.

Compared to ordinary communication optical cables, the composite fiber-optic overhead ground wire is exposed in use to severe conditions such as extension due to wire tension, vibration due to wind, and extension due to temperature increases, e.g., a maximum of about 300° C. during a lightning strike or the occurrence of shorting fault. Although the optical fibers are subject to expansion/contraction stress under such severe conditions, the optical fiber units are tightly accommodated in the respective grooves, and the grooved spacer, the cable and the optical fiber units are integrated with each other so that the optical fiber units are bound in the respective grooves with suitable friction. Accordingly, the optical fiber units, and specifically their optical fibers, hardly receive local stress but are uniformly expanded/contracted in the longitudinal direction.

What is claimed is:

1. A composite fiber-optic overhead ground wire comprising: an optical unit and a layer of stranded conductors provided around an outer periphery of said optical unit and wherein said optical unit includes an optical fiber protecting tube, a spacer provided with grooves helically formed in an outer periphery of said spacer, and a plurality of optical fiber units each formed of a plurality of coated optical fibers and accommodated in said grooves of said spacer each of said optical fiber units comprising:

a tension member;

a plurality of coated optical fibers each formed of an optical glass fiber and a primary coating layer provided on an outer periphery of said optical glass fiber, said coated optical fibers being stranded around an outer periphery of said tension member;

a first heat-resistant thin tape wound around an outer periphery of said stranded coated optical fibers;

a layer of interposition material having a cushioning effect and provided around said first heat-resistant thin tape; and a second heat-resistant thin tape wound around an outer periphery of said layer of interposition material.

2. A composite fiber-optic overhead ground wire according to claim 1, wherein said optical fiber units have an outer diameter substantially equal to the depth of said grooves so as to be accommodated in a substantially restraint state in said helical grooves of said spacer.

3. A composite fiber-optic overhead ground wire according to claim 1, wherein said optical fiber units have an outer diameter substantially equal to the width of said grooves so as to be accommodated in a substantially restraint state in said helical grooves of said spacer.

4. An optical fiber unit comprising:

a tension member;

a plurality of coated optical fibers each formed of an optical glass fiber and a primary coating layer provided on an outer periphery of said optical glass fiber, said coated optical fibers being stranded around an outer periphery of said tension member;

a first heat-resistant thin tape wound tightly around and in contact with an outer periphery of said stranded optical fibers;

a layer of interposition material having a cushioning effect and provided around and in contact with said first heat-resistant thin tape; and a second heat-resistant thin tape wound around and in contact with an outer periphery of said layer of interposition material.

* * * * *